(12) United States Patent
Herrmann et al.

(10) Patent No.: US 7,746,915 B1
(45) Date of Patent: Jun. 29, 2010

(54) WIRELESS NETWORK FOR REQUESTING A CONTENTION CHANNEL

(75) Inventors: Christoph Herrmann, Aachen (DE); Yonggang Du, Aachen (DE)

(73) Assignees: U.S. Philips Corporation, Andover, MA (US); Sharp Corporation, Osaka (JP)

( * ) Notice: Subject to any disclaimer, the term of this patent is extended or adjusted under 35 U.S.C. 154(b) by 864 days.

(21) Appl. No.: 09/763,845

(22) PCT Filed: Jun. 29, 2000

(86) PCT No.: PCT/EP00/06073
§ 371 (c)(1),
(2), (4) Date: Feb. 27, 2001

(87) PCT Pub. No.: WO01/03324
PCT Pub. Date: Jan. 11, 2001

(30) Foreign Application Priority Data
Jul. 3, 1999 (DE) .................. 199 30 509

(51) Int. Cl.
*H04B 1/00* (2006.01)
(52) U.S. Cl. .................................... 375/130
(58) Field of Classification Search ............... 375/130, 375/135, 136, 142, 143, 144, 146, 147, 150, 375/152, 343, 350; 370/331, 332, 334, 341, 370/414, 416, 418; 455/433, 435.1, 436, 455/437, 438, 439, 440, 441, 442, 443
See application file for complete search history.

(56) References Cited

U.S. PATENT DOCUMENTS 5,883,887 A * 3/1999 Take et al. .................. 370/329
6,240,083 B1 * 5/2001 Wright et al. ............... 370/348
6,330,459 B1 * 12/2001 Crichton et al. ........... 455/562.1
6,381,229 B1 * 4/2002 Narvinger et al. ........... 370/328
6,389,056 B1 * 5/2002 Kanterakis et al. .......... 375/130
6,400,695 B1 * 6/2002 Chuah et al. ................ 370/310
6,400,752 B1 * 6/2002 Suzuki et al. ............... 375/133
6,606,313 B1 * 8/2003 Dahlman et al. ............ 370/347
6,621,807 B1 * 9/2003 Jung et al. .................. 370/335
7,113,494 B1 9/2006 Dispensa et al.

FOREIGN PATENT DOCUMENTS

EP 0765096 A2 3/1997
WO WO 9849857 11/1998

OTHER PUBLICATIONS

"ETSI SMG2, Meeting No. 24, Cork, Ireland, Dec. 1-5, 1997, TDOC SMG2 359/97, Concept Group Alpha-Wideband Direct-Sequence CDMA (WCDMA), Evaluation Document (3.0), Part 1: System Description, Performance Evaluation" pp. 1-53.
By John G. Proakis; Digital Communications, Third Addition; International Edition 1995; Mcgraw-Hill International Editions; Elelctrical Engineering Series. Table of Contents and pp. 724-729.

* cited by examiner

*Primary Examiner*—Sam K Ahn

(57) ABSTRACT

A wireless network employs at least a base station (1 to 3) and a plurality of assigned terminals (4 to 14) for exchanging user data and control data. That base station (1 to 3) includes a device (21, 22) for correlating a signaling sequence transmitted by at least one terminal (4 to 14) to indicate the wish to use a contention channel and for detecting the pulse evolved from a received and correlated signaling sequence. After a signaling sequence has been detected, the base station (1 to 3) transmits a provision message over a contention channel to be utilized by the assigned terminals (4 to 14).

27 Claims, 4 Drawing Sheets

WIRELESS NETWORK FOR REQUESTING A CONTENTION CHANNEL

BACKGROUND

The invention relates to a wireless network comprising at least a base station and a plurality of assigned terminals for exchanging user data and control data.

In the document "ETSI SMG2, Meeting no. 24, Cork, Ireland, 1-5 Dec. 1997, Tdoc SMG2 359/97, Concept Group Alpha—Wideband Direct-Sequence CDMA (WCDMA), EVALUATION DOCUMENT (3.0), part 1: System Description, Performance Evaluation" a radio network operating according to the CDMA method (CDMA—Code-Division Multiple Access) is proposed. The radio network comprises a plurality of radio cells having each a base station and terminals or mobile stations located therein. After a terminal has been registered and synchronized, it transmits a random-access burst over a contention channel which is denoted a Random-Access CHannel RACH, for example, when a user channel is requested. The random-access burst comprises a preamble part and a data part. The preamble part comprises 16 symbols (preamble sequence) which is spread by an orthogonal Gold code (preamble code). The orthogonal Gold code contains 256 chip intervals. The data part contains a field with an identification for the terminal, a field for featuring the requested service (short packet transmission, dedicated—channel set-up, etc.), an optional field for data packets (optional user packet) and a CRC field for error detection. A random-access burst received from a base station is supplied via a matched filter, a preamble correlator, and a peak detector to a circuit portion estimating the time delay of the data part, which circuit portion controls a RAKE circuit for the evaluation of the data part. Thus, a peak detection based on a correlation is used here with subsequent message decoding. The RACH channel is permanently available then (permanent channel).

SUMMARY

It is an object of the invention to provide a wireless network in which more transmission capacity is available.

The object is achieved by a wireless network employing a base station and a plurality of assigned terminals, in that the base station includes a device for correlating a signaling sequence transmitted by at least one terminal to indicate the wish to use a contention channel and for detecting the pulse evolved from a received and correlated signaling sequence, and in that the base station, after the detection of a signaling sequence, is provided for transmitting a provision message over a contention channel to be used by one of the assigned terminals.

The wireless network according to the invention is understood to mean a network comprising a plurality of radio cells in which a base station and a plurality of terminals respectively, transmit control and user data in a wireless fashion. A wireless transmission is used for transmitting information by, for example, radio, ultrashell or infrared paths.

After the synchronization of a terminal with the assigned base station, this terminal is further to be registered with the assigned base station. A terminal transmits registration information by a contention channel (RACH). According to the invention, such a contention channel is requested by a terminal by means of a signaling sequence and always used only after such a request. After the signaling sequence has been detected, a base station provides such a contention channel which is not continuously available. For this purpose, a respective provision message is transmitted to the assigned terminals.

Such a signaling sequence may be a Golay Gold or Kasami sequence having good auto and cross-correlation properties. The base station includes a device (for example, a matched filter) in which a correlation is effected of the received signaling sequences. The pulse evolved from the correlation is detected.

Since such a contention channel is only available after a request by means of a signaling sequence, the channel may further be used for other purposes. This means a saving of transmission capacity compared to the known wireless networks, and a reduction of collisions when this contention channel is used.

After a signaling sequence has been transmitted by a terminal, and a provision message has been received, a terminal identification and/or at least a data packet is transmitted over the contention channel. However, it is then not impossible for a terminal to use a plurality of contention channels. A terminal can also use one of various time slots of the transmitting-end reference frame for transmitting a signaling sequence, as a result of which there is less probability of collisions. There is proposed to use one signaling sequence from a plurality of signaling sequences. Different signaling sequences may also be used for requesting one or more contention channels with different data rates.

Also, measurements can be taken when a terminal does not receive an acknowledgement of the reception of a signaling sequence, or an acknowledgement of the reception of data transmitted by one or more contention channels.

The invention also relates to a base station, a terminal and a method of exchanging user data and control data in a wireless network between at least a base station and a plurality of assigned terminals.

BRIEF DESCRIPTION OF THE DRAWINGS

Examples of embodiment of the invention will be further explained with reference to the Figure, in which.

DETAILED DESCRIPTION

Figure 1:
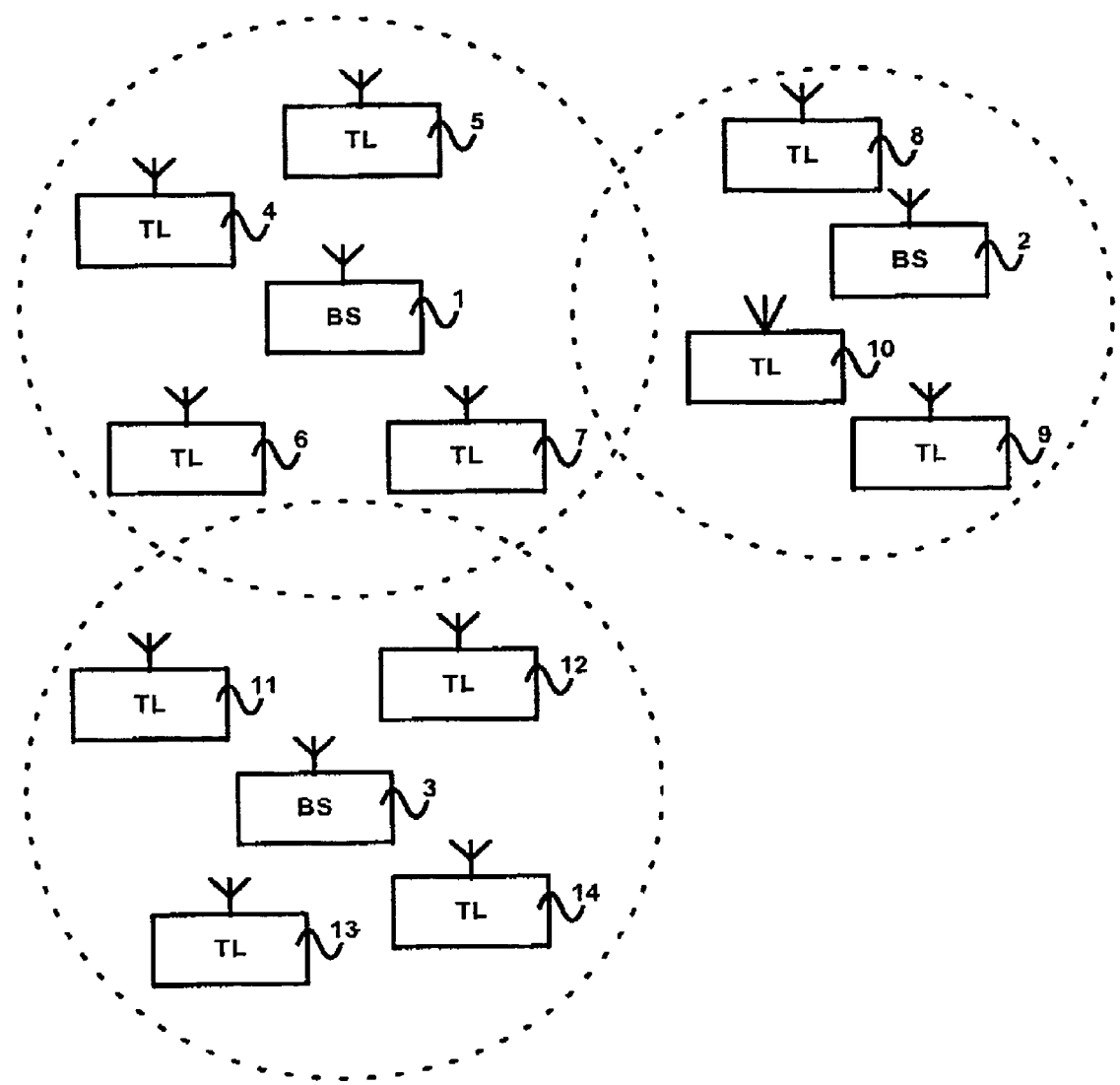
FIG. 1 shows a wireless network comprising a plurality of base stations and terminals.

FIG. 1 shows a wireless network, for example, a radio network, comprising a plurality of base stations ("BS") 1 to 3 and a plurality of terminals ("TL") 4 to 14. Certain terminals 4 to 14 are assigned to a base station 1 to 3. In the example shown in FIG. 1, terminals 4 to 7 are assigned to base station 1, terminals 8 to 10 are assigned to base station 3, and terminals 11 to 14 are assigned to base station 3. An exchange of control data takes place at least between the base station and the terminals. An exchange of user data can take place between the base station and the terminals as well as between the terminals. In both cases the link for the transmission of user data is set up by the base station. The terminals 4 to 14 are usually mobile stations which are controlled by a stationary base station 1 to 3. However, a base station 1 to 3 may also be mobile, as appropriate.

In the wireless network are transmitted, for example, radio signals according to the FDMA, TDMA or CDMA method (FDMA=Frequency-Division Multiple Access, TDMA=Time-Division Multiple Access, CDMA=Code-Division Multiple Access) or in conformity with a combination of the methods.

According to the CDMA method, which is a special code spreading method, binary information (data signal) originating from a user is modulated with a different code sequence. Such a code sequence comprises a pseudo-random square-wave signal (pseudo-noise code) whose rate, also referred to as chip rate, is generally considerably higher than that of the binary information. The duration of a square-wave pulse of the pseudo-random square-wave signal is referred to as chip interval $T_c$. $1/T_c$ is the chip rate. The multiplication or modulation respectively, of the data signal by the pseudo-random square-wave signal results in a spreading of the spectrum by the spreading factor $N_c=T/T_c$, where T is the duration of a square-wave pulse of the data signal.

User data and control data are transmitted between at least one terminal and a base station over channels predefined by the base station. A channel is determined by a frequency range, a time range and, for example, in the CDMA method, by a spreading code. The radio link from the base station to the terminals is referred to as a down link and that from the terminals to the base station as an uplink. In this way data are transmitted from the base station to the terminals over down link channels and from terminals to the base station over uplink channels. For example, a down link control channel may be provided which is used for broadcasting control data from the base station to all the terminals prior to a connection set up. Such a channel is referred to as a down link broadcast control channel. For transmitting control data from a terminal to the base station prior to a connection set-up, for example, an uplink control channel assigned by the base station can be used which, however, can also be accessed by other terminals. An uplink channel that can be used by a plurality of or all the terminals is referred to as a common uplink channel. After a connection set-up, for example, between a terminal and the base station, user data are transmitted over a down link and an uplink user channel. Channels that are set up only between one transmitter and one receiver are referred to as dedicated channels. As a rule, a user channel is a dedicated channel that can be accompanied by a dedicated control channel for transmitting link-specific control data.

For integrating a terminal with a base station, one contention channel is sufficient which will be referenced signalized RACH channel (RACH=Random-Access CHannel). Also data packets can be transmitted by such a signalized RACH channel.

For user data to be exchanged between the base station and a terminal it is necessary that the terminal is synchronized with the base station. For example, from the GSM system (GSM=Global System for Mobile communication), in which a combination of FDMA and TDMA method is used, it is known that after a suitable frequency range has been determined on the basis of predefined parameters, the position in time of a frame is determined (frame synchronization) with the aid of which the sequence in time for transmitting data is determined. Such a frame is always necessary for the data synchronization of terminals and base station in TDMA, FDMA and CDMA methods. Such a frame may contain various sub-frames or form a superframe together with a plurality of other successive frames. For simplicity, a frame denoted reference frame will be started from in the following. This reference frame may be, for example, the frame having a duration of 10 ms in the UMTS system.

For carrying out a frame synchronization, all the terminals must be synchronized with the base station by means of pulses transmitted by the base station. When no code spreading method (for example, CDMA method) is used (for example, a TDMA method is used), the pulse duration corresponds exactly with the time interval necessary for transmitting one bit. When a code spreading method is used indeed, the pulse duration corresponds with one chip interval. A bit interval then corresponds with a plurality of chip intervals. For frame synchronization it is necessary that a special pulse sequence is transmitted by the base station. The start time of the pulse sequence corresponds to the start time of a frame.

In the following it is assumed that the terminals have already been synchronized with the base station, but have not yet been registered there. For the registration a terminal is to transmit certain information (at least a terminal identification) to the base station via a signalized RACH channel. Since, according to the invention, a signalized RACH channel is not continuously available, this channel is rendered available by a base station after a request from a terminal. For requesting a signalized RACH channel, a terminal transmits a signaling sequence. Such a signaling sequence transmitted by a terminal is a pseudo-random square-wave signal. This signaling sequence can be sent, for example, during a certain time slot (or time window) of the reference frame at the transmitting end. A terminal can obtain knowledge about this certain time slot from the base station after it has synchronized with it via a down-link broadcast control channel.

A base station includes a matched filter and a peak detector connected downstream in the circuit for detecting the signaling sequences transmitted by a terminal. When the peak detector of the base station detects a peak on the output of the matched filter within a time slot (or time window) of the reference frame on the receiving side, there is at least one request from a terminal for a signalized RACH channel.

The matched filter is clocked at a clock rate that is at least equal to the maximum chip rate when code spreading is used, or equal to the maximum bit rate when no code spreading is used. The terminals transmit such signaling sequences, which have a good autocorrelation property, to make an unambiguous detection of a signaling sequence possible. Furthermore, the signaling sequence is to have a good cross-correlation property i.e. the correlation with other signals to be transmitted in the network is to be small. Thus, on the one hand, the other signals transmitted within the network and received by the matched filter are interpreted by the peak detector as a negligibly small noise signal whereas, on the other hand, the signaling sequences are interpreted as a negligibly small noise or interference signal by other circuit elements in the base station which process the other signals transmitted within the network. A signaling sequence of this kind, having good auto and cross-correlation properties is, for example, a sequence from the book "J. G. Proakis: Digital Communications by J. G. Proakis, third edition, McGraw-Hill International Editions, 1995, pp. 724 to 729) known as Gold and Casami sequence. Also Golay sequences can be used. The pulses produced on the output of the matched filter are a parameter for the energy of the signaling sequences.

When a base station detects at least one signaling sequence, the base station renders a signalized RACH channel according to the invention available to all the terminals in the assigned radio cell. This means that the base station transmits a provision message to all the terminals via a down-link broadcast control channel. For example, in the FDD mode (FDD=Frequency-Division Duplexing) of UMTS, the signalized RACH channel would be determined by a scrambling code and a group of spreading codes.

The base station cannot recognize on the basis of the signaling sequence which terminal has transmitted a signaling sequence. The transmitted provision message of the base station only tells that the terminals, which have transmitted a specific signaling sequence during the specific time slot (or time window) can use one or more signalized RACH channels indicated in the provision message. The terminals can use one of the signalized RACH channels for transmitting information or also use several channels simultaneously. Therefore, these terminals, which have transmitted a signaling sequence and received the provision message from the base station, use one or more signalized RACH channels for effecting, for example, a registration with a base station. The base station then acknowledges the reception of a registration request to the terminal that has sent, for example, the request for registration by the assigned signaling RACH channel. After the registration, the terminal in question is included in the radio cell and can exchange user data and further control data with the base station and with the other terminals of the radio cell.

It is also possible that a plurality of time slots instead of one are predefined within a transmitting-end reference frame. Such a time slot can be used by a terminal for transmitting a signaling sequence. In the provision message the base station is then to indicate the time slot used by the terminal.

When a plurality of terminals have simultaneously transmitted a signaling sequence during the specific time range (or time window), the base station detects these signaling sequences. After the terminals that have simultaneously transmitted a signaling sequence have received the provision message, it is possible for these terminals also to transmit, for example a registration request at the same time. These various transmitted registration requests interfere with each other and can therefore not be recognized by the base station. If a terminal receives no acknowledgement after a certain predefined period of time, the terminal establishes that there is a collision and transmits a new signaling sequence again after a certain random period of time.

Figure 2:
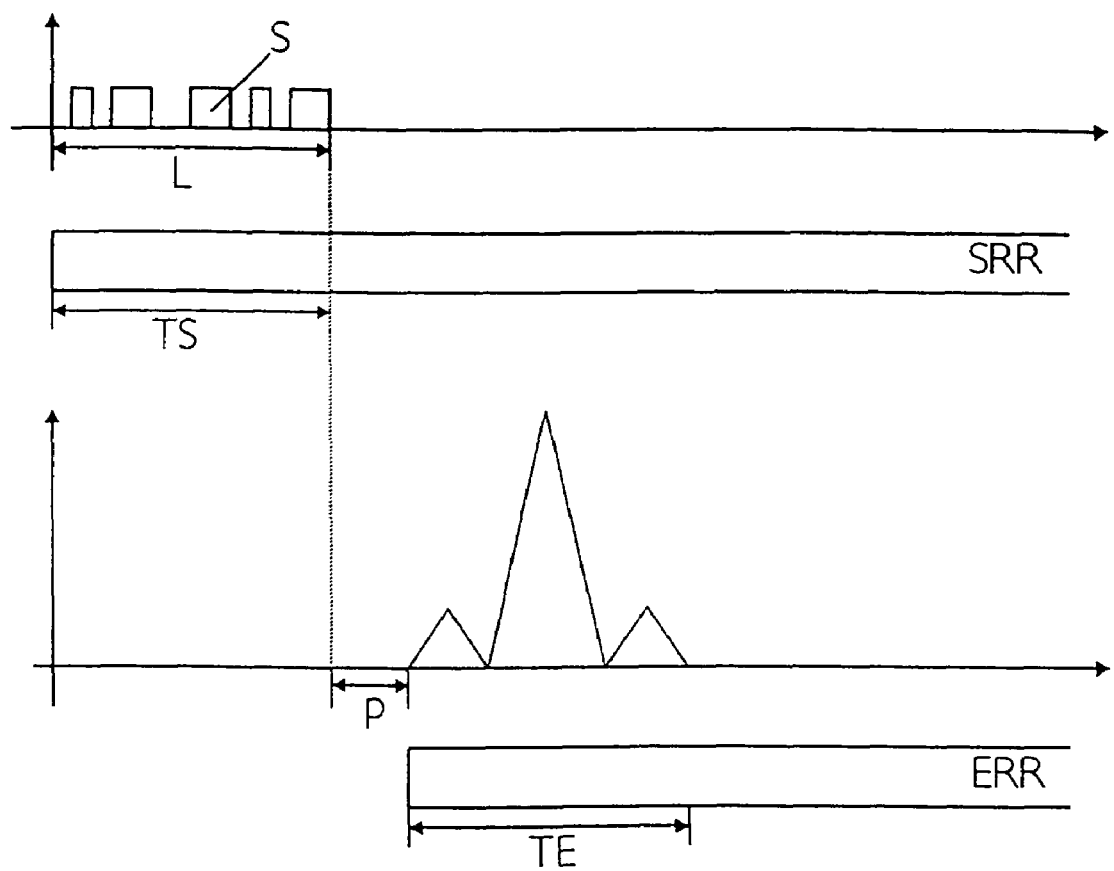
FIG. 2 shows a signaling sequence transmitted by way of example by a terminal, and an output signal of a matched filter received in a receiver of a base station after a signaling sequence has been received.

FIG. 2 shows by way of example signaling sequences S plotted against a time section TS of a transmitting-end reference frame SRR and the output signal of the matched filter in the base station plotted against the respective time slot TE of a receiving-end reference frame ERR. The signaling sequence S has the sequence duration or sequence length L. In FIG. 2 is furthermore taken into account a propagation delay time p. The output signal of the matched filter comprises a main pulse and sub-pulses.

The duration of defined time slot (or time window) for the transmission of the signaling sequence and the duration of a signaling sequence depends on the following factors. A first factor forms the curacy of the estimate of the propagation delay of the signaling sequence to be transmitted from the terminals to the base station, a second factor is the delay spread characteristic based on multi-path propagation, a third factor is the auto-correlation properties of the signaling sequences of the terminals and a fourth factor is the cross-correlation properties of the signaling sequences of the terminals with signaling sequences of adjacent radio cells.

So far, the case ha been described where a terminal uses only a certain signaling sequence for requesting a signalized RACH channel. It is also possible that a plurality of different signaling sequences are used to reduce the hazard of collisions. The signaling sequences to be used may be known to a terminal or, after the synchronization with the base station, be announced via the down-link broadcast control channel.

When requesting a signalized RACH channel, a terminal can select one signaling sequence at random from the multiplicity of signaling sequences.

With a signaling sequence taken from a multiplicity of signaling sequences, also one or various RACH channels having different data rates can be requested. The data rate of a RACH channel can be set via the spreading factor. For example, a first signaling sequence may mean that a RACH channel having a data rate of 64 kbits/s is requested and a second signaling sequence may mean that four RACH channels each having a data rate of 32 kbits/s are requested.

To structure the exchange of control data between a terminal utilizing a signalized RACH channel and a base station in a simple manner, the base station can, for example, by means of the provision message, also indicate the duration of use of a signalized RACH channel for a terminal. Alternatively it is possible to predefine this duration of use as a system parameter.

A terminal can transmit a signaling sequence for the first time with minimum energy. If no provision message is received by the terminal, a further signaling sequence can be transmitted with increased energy. This procedure is repeated up to a maximum energy value or until a provision message transmitted by the base station is received.

The invention can be inserted as an additional circuit portion into any existing or still-to-be-introduced mobile radio system such as, for example, GSM or UMTS mobile radio system (UMTS=Universal Mobile Telecommunication System). FIGS. 3 to 6 show a receiver (FIG. 3) and a transmitter (FIG. 4) of a base station and a receiver (FIG. 5) and a transmitter (FIG. 6) of a terminal.

Figure 3:
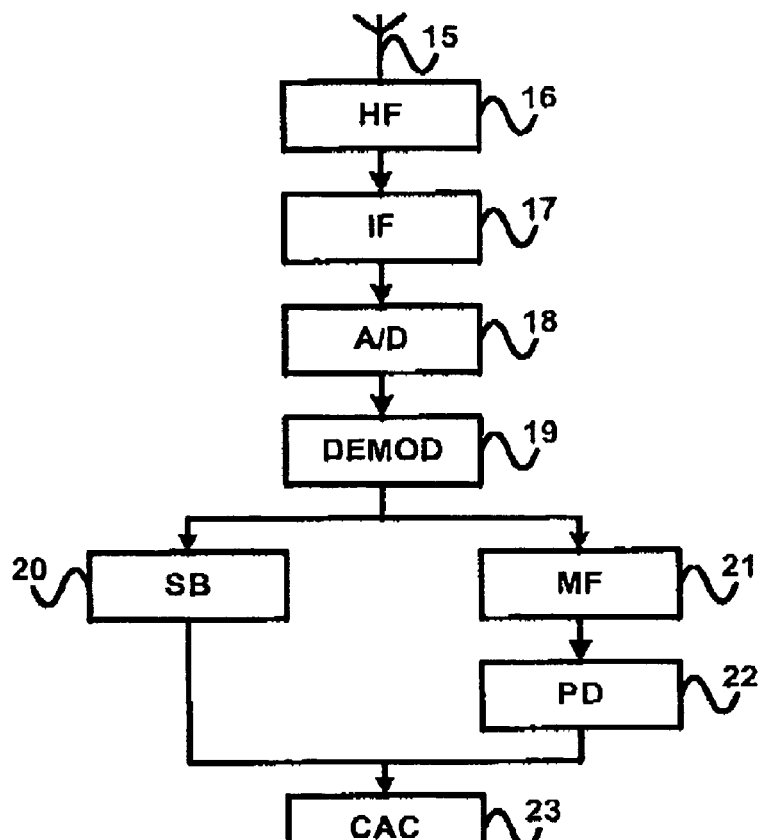
FIG. 3 shows a receiver of the base station.

The block diagram shown in FIG. 3 of a receiver of a base station contains as known elements (for example, from GSM mobile radio system or a CDMA system) an antenna 15, a high-frequency block ("HF") 16, an intermediate frequency block ("IF") 17, an analog/digital converter ("A/D") 18, a demodulator ("DEMOD") 19 and a switching block ("SB") 20 which executes, for example, the switching functions of channel demultiplexing, de-interleaving, channel decoding and, when a CDMA system is used, also de-spreading. The control and user signals occurring in the baseband are applied to a channel access control block ("CAC") 23 which transfers the various signals to the respective units for further processing, for example, to a switching center According to the invention, the receiver of the base station includes a matched filter ("MF") 21 which checks the received signals to find whether there is a signaling sequence. If a signaling sequence has been detected, this is established by a next peak detector ("PD") 22 and announced to the channel access control block 23 which may be, for example, a processor. The channel access control block 23 leads this message to further control elements downstream in the circuit and not represented here, which then, for example by means of generated control data, assign a user channel to the terminal via the transmitter of the base station.

Figure 4:
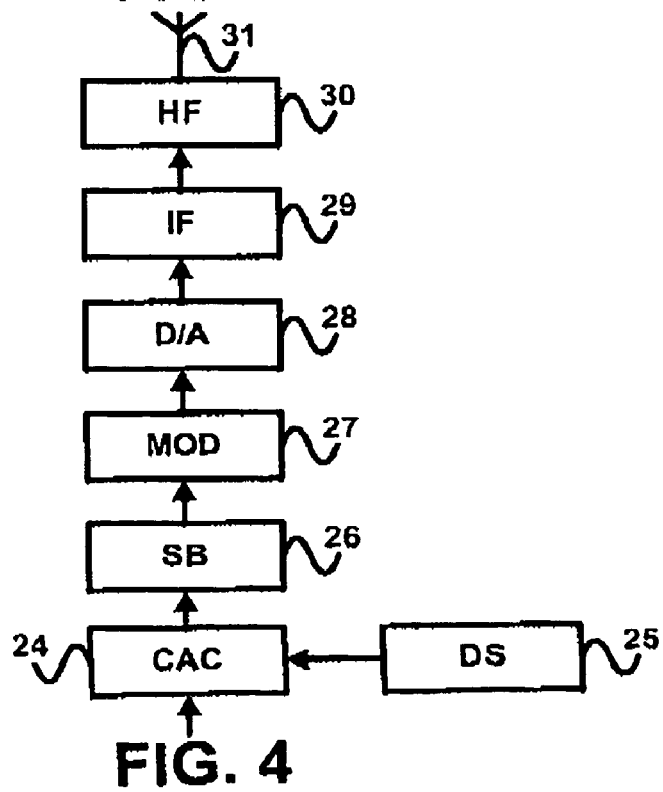
FIG. 4 shows a transmitter of a base station.

The transmitter of the base station represented in FIG. 4 also includes a channel access control block ("CAC") 24 which receives data from various sources ("DS") 25. Such a source may be, for example, a switching center which produces user data, or a control element which supplies control data. For example, these control data may contain a provision message about a signalized RACH channel to be used for a terminal, which terminal has previously requested a signalized RACH channel by means of a signaling sequence. The switching block ("SB") 26 following the control block 24 carries out the switching functions of, for example, channel coding, interleaving, channel multiplexing and, when a CDMA system is used, also spreading The output signal of the block 26 is applied to an antenna 31 via a modulator ("MOD") 27, a digital/analog converter ("D/A") 28, an intermediate-frequency block ("IF") 29 and a high-frequency block ("HF") 30. All the elements 25 to 31 may be elements known from existing mobile radio systems.

Figure 5:
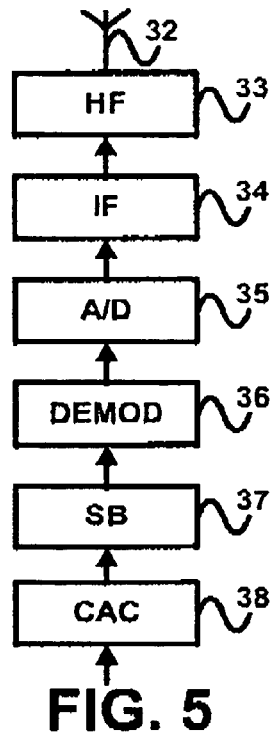
FIG. 5 shows a receiver of a terminal and FIG. 6 shows a transmitter of a terminal.
Figure 6:
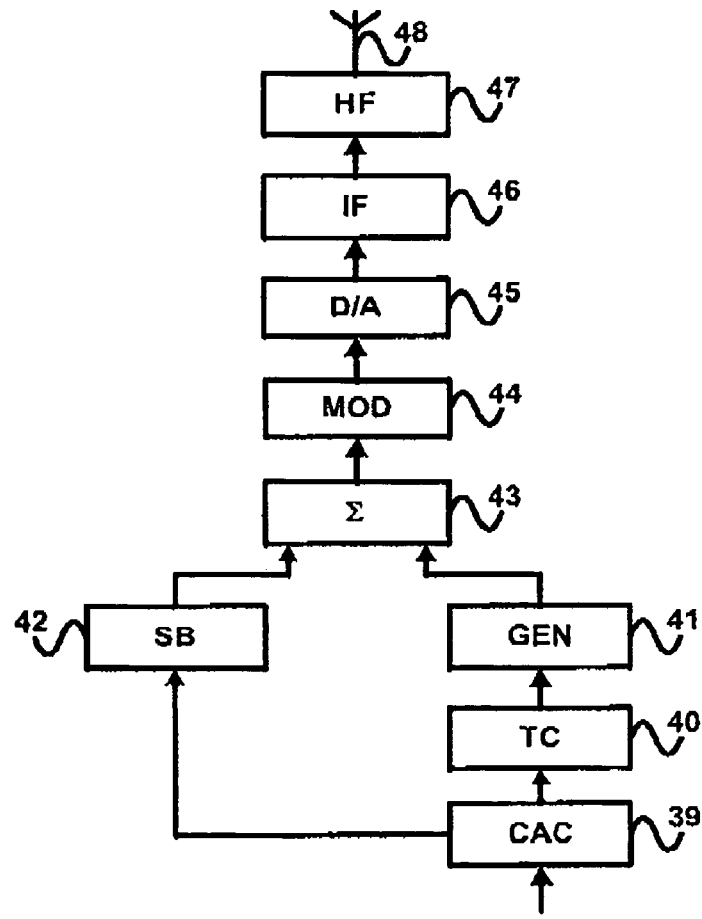

A block circuit diagram of a receiver of a terminal is shown in FIG. 5. This receiver includes as elements known from, for example, a GSM mobile radio system or a CDMA system, an antenna 32, a high-frequency block ("HF") 33, an intermediate-frequency block ("I/F") 34, an analog/digital converter ("A/D") 35, a demodulator ("DEMOD") 36, a switching block ("SB") 37 having several functions and a channel access control block ("CAC") 38 which supplies control and user data to various sinks (for example, low-frequency circuit for converting user data into speech data) The block 37 is charged with, for example, the switching functions of channel demultiplexing, de-interleaving, channel decoding and, when a CDMA system is used, de-spreading. The channel access control block 38 evaluates certain channels relevant to the terminal such as, for example, a user channel or a downlink broadcast control channel. This information is transferred to certain other circuit elements in the terminal which are not further shown here The terminal includes in a transmitter whose associated block circuit diagram is shown in FIG. 6, also a channel access control block ("CAC") 39 which controls the channel access. The channel access control block 39 delivers data to a switching block ("SB") 42, which executes the switching functions of channel coding, interleaving, channel multiplexing and, when a CDMA system is used, also spreading. The user data and control data are received from different sources by the channel access control block 39. Such a source may be, for example, a low-frequency circuit which produces speech data as user data, or a control element which supplies control data. For example, these control data may be information about the start time of a signaling sequence. A time controller ("TC") 40 indicates the instant at which a signaling sequence is transmitted and also the beginning and the end of a time slot. The generator includes a memory for storing various signaling sequences. The signaling sequence to be transmitted is selected from the channel access control block. Signaling sequences may be written, as appropriate, in the memory of the generator ("GEN") 41. The generator 41 and the time controller 40 are initialized after the information is received about the signaling sequence to be used When no change of the signaling sequence and/or start time is indicated by the associated base station, a further initialization of generator 41 and time controller 40 is not necessary.

The user data and control data processed in the block 42 are supplied to a superposition circuit ("Σ") 43, which further receives output signals of the generator 41. The output signal produced by the superposition circuit 43 is transmitted via a modulator ("MOD") 44 to a digital/analog converter ("D/A") 45, an intermediate frequency block ("IF") 46 and a high-frequency block ("HF") 47, which radiates by an antenna 48 the signals formed in the high-frequency block While the embodiments of the invention disclosed herein are presently considered to be preferred, various changes and modifications can be made without departing from the spirit and scope of the invention The scope of the invention is indicated in the appended claims, and all changes that come within the meaning and range of equivalents are intended to be embraced therein.

The invention claimed is:

1. A wireless network, comprising:
   a base station in communication with a plurality of terminals;
   at least one terminal of the plurality of terminals operable to be assigned to a radio cell of the base station for exchanging user data and control data, the terminal being further operable to transmit a first signaling sequence as an indication to use one of a plurality of contention channels;
   wherein the base station, upon receiving the first signaling sequence, is operable to broadcast a provision message indicating a channel that is available to the plurality of terminals for contention-based access.

2. The wireless network of claim 1,
   wherein the terminal is further operable to transmit the first signaling sequence during a specific time slot of a transmitting-end reference frame; and
   wherein, after receiving the provision message from the base station, the terminal is further operable to transmit at least one of a terminal identification and a data packet over the channel to the base station.

3. The wireless network of claim 1, wherein the base station includes:
   a matched filter operable to generate a pulse; and
   a peak detector operable to detect a peak of the pulse during a specific time slot of a receiving-end reference frame.

4. The wireless network of claim 1, wherein the terminal is further operable to transmit the first signaling sequence as one of a Gold sequence, a Kasami sequence or a Golay sequence during a specific time slot of a transmitting-end reference frame.

5. The wireless network of claim 1, wherein the terminal is further operable to transmit a second signaling sequence to the base station in response to a failure to receive an acknowledgement of the reception of the first signaling sequence by the base station within a predefined period of time after transmission of the first signaling sequence to the base station.

6. The wireless network of claim 1, wherein, subsequent to receiving the provision message, the terminal is further operable to transmit a second signaling sequence to the base station in response to a failure to receive an acknowledgement of a reception of data by the base station over an assigned contention channel.

7. The wireless network of claim 1, wherein the terminal is further operable to re-transmit the first signaling sequence to the base station with increased energy in response to a failure to receive an acknowledgement of the reception of the first signaling sequence by the base station within a predefined period of time after the first transmission of the first signaling sequence to the base station.

8. The wireless network of claim 1,
   wherein the terminal is further operable to receive an identification of a specific time slot of a reference frame, and to transmit the first signaling sequence during the specific time slot; and
   wherein, after receiving the provision message, the terminal is further operable to transmit at least one of a terminal identification and a data packet over a first contention channel to the base station in response to the provision message.

9. The wireless network of claim 1, where the first signaling sequence is one of a plurality of signaling sequences associated with the wireless network.

10. The wireless network of claim 9, wherein each signaling sequence is further associated with a different data rate.

11. The wireless network of claim 1,
wherein the terminal, upon receiving the provision message, is further operable to transmit a registration request to the base station, and
wherein the base station, upon receiving the registration request, is further operable to acknowledge the reception of the registration request to the terminal and assign the terminal to the radio cell.

12. The wireless network of claim 1, wherein the channel is available for contention-based access for a limited time period.

13. A base station in a wireless network for exchanging user data and control data with a plurality of terminals operable to be assigned a radio cell, the base station comprising:
a receiver operable to detect a signaling sequence from at least one of the terminals; and
a transmitter operable to transmit a provision message in response to the signaling sequence, the provision message indicating a channel that is available to the plurality of terminals for contention-based access.

14. The base station of claim 13, wherein the receiver includes:
a matched filter operable to generate a pulse; and
a peak detector operable to detect a peak of the pulse during a specific time slot of a receiving-end reference frame.

15. The base station of claim 13, further comprising:
a registration element operable to acknowledge the reception of a registration request to the terminal and assign the terminal to the radio cell.

16. The base station of claim 13, wherein the channel is available for contention-based access for a limited time period.

17. A terminal operable to be assigned a radio cell in a wireless network of a plurality of terminals for exchanging user data and control data with a base station, the terminal comprising:
a transmitter operable to transmit a first signaling sequence to the base station, the signaling sequence being indicative of a request for a channel to be made available for contention-based access by the transmitter; and
a receiver operable to receive a provision message from the base station subsequent to the transmission of the first signaling sequence by the transmitter, the provision message indicating the channel that is available to the plurality of terminals for contention-based access.

18. The terminal of claim 17,
wherein the transmitter is further operable to transmit the first signaling sequence during a specific time slot of a transmitting-end reference frame; and
wherein, after receiving the provision message, the transmitter is further operable to transmit at least one of a terminal identification and a data packet over the channel to the base station.

19. The terminal of claim 17, wherein the transmitter is further operable to transmit the first signaling sequence as one of a Gold sequence, a Kasami sequence or a Golay sequence during a specific time slot of a transmitting-end reference frame.

20. The terminal of claim 17, wherein the transmitter is further operable to transmit a second signaling sequence to the base station in response to a failure to receive an acknowledgement of the reception of the first signaling sequence by the base station within a predefined period of time after transmission of the first signal sequence to the base station.

21. The terminal of claim 17, wherein, subsequent to receiving the provision message, the transmitter is further operable to transmit a second signaling sequence to the base station in response to a failure to receive an acknowledgement of a reception of data by the base station over the channel.

22. The terminal of claim 17, wherein the transmitter is further operable to re-transmit the first signaling sequence to the base station with increased energy in response to a failure to receive an acknowledgement of the reception of the first signaling sequence by the base station within a predefined period of time after the first transmission of the first signal sequence to the base station.

23. The terminal of claim 17,
wherein the transmitter is further operable to receive an identification of a specific time slot of a reference frame, and to transmit the first signaling sequence during the specific time slot; and
wherein, after receiving the provision message from the base station, the terminal is further operable to transmit at least one of a terminal identification and a data packet over the channel to the base station in response to the provision message.

24. The terminal of claim 17, further comprising:
a requesting element operable to format a registration request to be transmitted to the base station in response to the provision message received from the base station.

25. A method of exchanging user data and control data in a wireless network of a plurality of terminals between a base station and a terminal of the plurality of terminals operable to be assigned a radio cell, the method comprising:
transmitting a signaling sequence from the terminal to the base station, the signaling sequence being indicative of a request by the terminal to use a channel for contention-based access;
detecting the signaling sequence by the base station; and
broadcasting a provision message by the base station to the plurality of terminals in response to the request, the provision message indicating the channel that is available to the plurality of terminals for contention-based access.

26. The method of claim 25, further comprising:
transmitting a registration request to the base station from the terminal in response to the terminal receiving the provision message from the base station;
acknowledging receipt of the registration request by the base station; and
assigning the terminal to the radio cell.

27. The method of claim 25, wherein the channel is available for contention-based access for a limited time period.

* * * * *